(12) United States Patent
Hussein et al.

(10) Patent No.: US 9,243,167 B2
(45) Date of Patent: Jan. 26, 2016

(54) SULFUR MODIFIED POLYVINYL ACETATE (PVAC)

(71) Applicants: Saudi Arabian Oil Company, Dhahran (SA); King Fahd University of Petroleum and Minerals, Dhahran (SA)

(72) Inventors: Ibnelwaleed A Hussein, Dhahran (SA); Mohammed H Al-Mehthel, Dhahran (SA); Hamad I. Al-Abdul Wahhab, Dhahran (SA); Saleh H. Al-Idi, Dhahran (SA); Mohammed A. Suleiman, Dhahran (SA)

(73) Assignee: Saudi Arabian Oil Company (SA)

( * ) Notice: Subject to any disclaimer, the term of this patent is extended or adjusted under 35 U.S.C. 154(b) by 83 days.

(21) Appl. No.: 13/761,479

(22) Filed: Feb. 7, 2013

(65) Prior Publication Data

US 2013/0203902 A1     Aug. 8, 2013

Related U.S. Application Data

(60) Provisional application No. 61/596,050, filed on Feb. 7, 2012.

(51) Int. Cl.
| | |
|---|---|
| C08K 3/06 | (2006.01) |
| C08K 3/30 | (2006.01) |
| C09D 195/00 | (2006.01) |
| E01C 23/06 | (2006.01) |
| C08L 95/00 | (2006.01) |

(52) U.S. Cl.
CPC ............... *C09D 195/00* (2013.01); *C08K 3/06* (2013.01); *C08L 95/00* (2013.01); *E01C 23/06* (2013.01)

(58) Field of Classification Search
CPC ........... C08F 8/34; C08F 118/08; C08K 3/06; C08K 3/30; C08L 31/04; C08L 95/00; C09D 195/00; E01C 23/06
USPC ..................................... 524/80, 418; 525/354
See application file for complete search history.

(56) References Cited

U.S. PATENT DOCUMENTS

| | | | |
|---|---|---|---|
| 2,075,045 A | | 3/1937 | Manson |
| 3,290,266 A | * | 12/1966 | Barnes et al. ............... 524/80 |
| 3,997,355 A | | 12/1976 | Santucci et al. |
| 4,130,516 A | | 12/1978 | Gagle et al. |
| 4,242,246 A | | 12/1980 | Maldonado et al. |
| 5,096,743 A | | 3/1992 | Schoenbeck |
| 5,280,064 A | | 1/1994 | Hesp et al. |
| 6,004,425 A | | 12/1999 | Born et al. |
| 6,011,094 A | | 1/2000 | Planche et al. |
| 6,133,351 A | | 10/2000 | Hayner |
| 6,180,697 B1 | | 1/2001 | Kelly et al. |
| 7,951,857 B2 | | 5/2011 | Crews et al. |
| 2003/0037704 A1 | | 2/2003 | Bailey et al. |
| 2005/0171276 A1 | | 8/2005 | Matsuda et al. |
| 2010/0256265 A1 | | 10/2010 | Hussein et al. |

FOREIGN PATENT DOCUMENTS

| | | |
|---|---|---|
| GB | 2462427 | 10/2010 |
| WO | 0190250 | 11/2001 |
| WO | 2010/120482 A1 | 10/2010 |

OTHER PUBLICATIONS

PCT Notification of Transmittal of the International Search Report and the Written Opinion of the International Searching Authority, or the Declaration; dated May 16, 2013; International Application No. PCT/US2013/025086; International File Date: Feb. 7, 2013.
Rodriguez-Vazquez, Miguel, et al., Degradation and stabilisation of poly(ethylene-stat-vinyl)acetate): 1-Spectroscopic and rheological examination of thermal and thermo-oxidative degradation mechanisms, Polymer Degradation and Stability, 2006, pp. 154-164, vol. 91, Elsevier, UK.
Al-Mehthel, Mohammed, et al., Sulfur Extended Asphalt as a Major Outlet for Sulfur that Outperformed Other Asphalt Mixes in the Gulf, The Sulphur Institute (TSI), Apr. 12-15, 2010, pp. 1-16, Qatar.
Becker, Yvonne, et al., Polymer Modified Asphalt, Vision Tecnological, 2001, pp. 39-50, vol. 9, No. 1.
Chen, J.S., et al., Fundamental Characterization of SBS-Modified Asphalt Mixed with Sulfur, Journal of Applied Polymer Science, 2007, pp. 2817-2825, vol. 103.
Saleem, Junaid, M.S., Sulfur Modification of Polymers for Use in Asphalt Binders, King Fand University of Petroleum and Minerals, 2008, p. 1, Abstract, SA.

\* cited by examiner

*Primary Examiner* — David W Wu
*Assistant Examiner* — Marie Reddick
(74) *Attorney, Agent, or Firm* — Bracewell & Giuliani LLP; Constance Gall Rhebergen; Linda L. Morgan

(57) ABSTRACT

Provided are a sulfur modified polymer composition, free from asphalt, bitumen or like compounds, and method of making same. The inclusion of 50% by weight sulfur, or greater, into the polymer composition results in a composition that is softer and having an increased melting point, relative to the unmodified polymer composition.

11 Claims, 8 Drawing Sheets

SULFUR MODIFIED POLYVINYL ACETATE (PVAC)

RELATED APPLICATION

This application claims priority to U.S. Provisional Patent Application No. 61/596,050 titled "Sulfur Modified Polyvinyl Acetate (PVAc)," filed on Feb. 7, 2012, the disclosure of which is incorporated herein by reference in its entirety.

FIELD OF THE INVENTION

This invention relates to modified polyvinyl acetate polymer. More particularly, this invention relates to sulfur modified polyvinyl acetate polymers, free from asphalt, bitumen or like compounds, having improved properties relative to unmodified polyvinyl acetate polymers.

BACKGROUND OF THE INVENTION

Sulfur is a co-product of oil and gas production that is produced in ever increasing quantities. For example, sulfur is currently produced at a rate of approximately 10,000 tons/day in Saudi Arabia. The rate of production is expected to increase to 12,000 tons/day in a few years. Although sulfur is a vital resource that is useful for the manufacture a myriad of products, the abundance of sulfur has resulted in worldwide reduction of its price. As worldwide sulfur supplies increase, the storage of the sulfur will present an environmental hazard. New uses of sulfur present one solution to the problem of storing the vast quantities of sulfur.

Previous studies relating to the degradation of PVAc in vacuum using TGA revealed a two stage decomposition. The first mass loss commenced at about 250° C. and continued to about 375° C., after which an inflexion preceded the second and final mass loss that ultimately led to complete decomposition of the polymer. The first mass loss stage was assigned mainly to the release of acetic acid and simultaneous formation of double bonds in the polymer backbone. The formation of both acetic acid and trans-vinylene species have been explained by comparison with pyrolytic cis or syn elimination of low molar mass ester model compounds. It was found that the addition of free radical inhibitors did not prevent elimination of acetic acid. However, previously studies also showed the formation of several volatile products using free radical mechanisms. It has also found that the acetic acid generated has a catalytic effect on degradation. This behavior has been compared to the catalytic effect of HCl on PVC.

Prior investigations have been conducted into inert and oxidative thermal degradation mechanism of PVAc and EVA copolymers using semi-crystalline and amorphous EVA having a VA content in the polymer backbone ranging from about 9 to 73% by weight. More specifically, EVA emulsions of Airflex EN 1035 and Airflex EAF 60 (55 and 60% solids in water, respectively) from Air Products containing 73 and 60% by weight vinyl acetate were utilized. The thermal study was performed over a temperature range of about 200° C. (to remove water and monomers) to about 600° C. and 650° C. for inert and oxidative conditions respectively. The inert degradation of PVAc as measured using a TGA coupled with mass spectrometry (TGA-MS) showed two degradation steps: the first and most intense step is deacytelation, which occurs between about 300 and 400° C. The end of the first thermal degradation step of PVAc in air has been reported to be around 310° C., corresponding to a loss of 95% of the acetic acid formed in the degradation process. Studies have shown that the major volatile degradation product is acetic acid, with smaller amounts of ketene, water, methane, carbon dioxide and carbon monoxide also being formed. Analysis of the degraded sample at 400° C. shows a highly regular unsaturated material. The second step of degradation involves a dehydrogenation reaction.

Thus, there exists a need to provide a modified polymer having improved properties, such as increased melting point, while at the same time providing a use for excess sulfur.

SUMMARY

Generally, sulfur modified polymer compositions, free from asphalt, bitumen or like compounds, and methods of making same are provided. Specifically, sulfur modified polyvinyl acetate polymers are provided having increased melting points relative to the unmodified polymer.

In one aspect, a sulfur modified polyvinyl acetate polymer composition is provided wherein the polymer composition includes a polyvinyl acetate polymer; sulfur, wherein the sulfur is present in an amount up to about 50% by weight; and wherein the composition is free from asphalt, bitumen or like compounds.

In certain embodiments, the sulfur is present in an amount between about 10 and 20% by weight. In alternate embodiments, the sulfur is present in an amount between about 20 and 30% by weight. In alternate embodiments, the sulfur is present in an amount between about 30 and 40% by weight. In alternate embodiments, the sulfur is present in an amount between about 40 and 50% by weight. In certain embodiments, at least a portion of the sulfur is present in elemental form. In certain embodiments, the sulfur modified polyvinyl acetate polymer composition has a melting point that is up to 50° C. greater than the melting point of the unmodified polyvinyl acetate polymer. In certain embodiments, the sulfur modified polyvinyl acetate polymer composition has a melting point that is between 10° C. and 50° C. greater than the melting point of the unmodified polyvinyl acetate polymer. In certain embodiments, the sulfur modified polyvinyl acetate polymer composition has a melting point that is between 10° C. and 30° C. greater than the melting point of the unmodified polyvinyl acetate polymer. In certain embodiments, the sulfur modified polyvinyl acetate polymer composition has a melting point that is between 20° C. and 40° C. greater than the melting point of the unmodified polyvinyl acetate polymer. In certain embodiments, the sulfur modified polyvinyl acetate polymer composition has a melting point that is between 30° C. and 50° C. greater than the melting point of the unmodified polyvinyl acetate polymer.

In certain embodiments, the polyvinyl acetate polymer has a molecular weight of between about 10,000 and 25,000, alternatively between about 25,000 and 75,000, alternatively between about 75,000 and 125,000.

In another aspect, a method for preparing a sulfur modified polyvinyl acetate composition, free from asphalt, bitumen or like compounds, is provided. The method includes the steps of providing a polyvinyl acetate polymer, wherein the polyvinyl acetate polymer has a melting temperature of less than about 140° C.; and heating the polyvinyl acetate polymer in the presence of elemental sulfur to a temperature of between about 150° C. and 200° C. and mixing the polyvinyl acetate polymer and sulfur such that elemental sulfur is incorporated into the polyvinyl acetate polymer to produce a sulfur modified polyvinyl acetate polymer.

In certain embodiments, between about 40 and 50% by weight sulfur is incorporated into the polyvinyl acetate polymer In certain embodiments, between about 50 and 70% by weight sulfur is incorporated into the polyvinyl acetate polymer. In certain embodiments, the polyvinyl acetate polymer and sulfur are mixed for at least about 15 minutes.

DETAILED DESCRIPTION OF THE INVENTION

Figure 1:
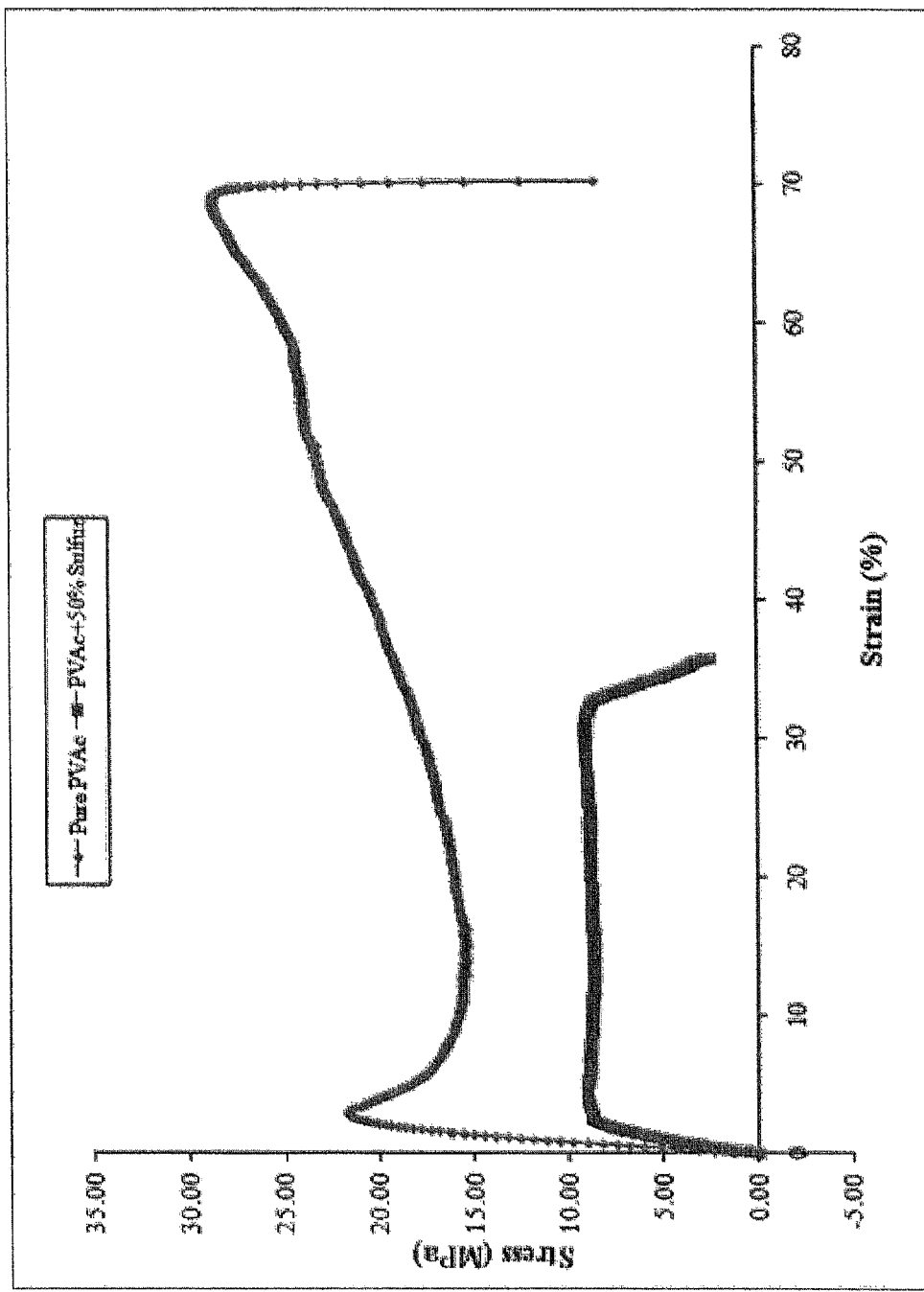
FIG. 1 is a stress-strain curve comparing pure polyvinyl acetate and sulfur modified polyvinyl acetate.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

Polyvinyl Acetate (PVAc) samples, free from asphalt, bitumen or like compounds, of different molecular weights were modified using elemental sulfur. The sulfur modified polyvinyl acetate polymers showed increased resistance to melting (i.e., increased melting point for the modified polymer) and produced a softer polymer than the original, unmodified polyvinyl acetate polymer. In general, polyvinyl acetate polymers were selected that had a melting temperatures of less than about 140° C. In general, the addition and mixing of sulfur was performed at a temperature greater than the melting point of the polyvinyl acetate polymer, for example in the range 150°-200° C. Alternatively, the addition and mixing of sulfur can be performed in the range of about 150-160° C., alternatively between about 160 and 170° C., alternatively between about 170 and 180° C., alternatively between about 180 and 190° C., alternatively between about 190 and 200° C. In general, the temperature at which the sulfur addition and mixing take place is maintained at a temperature that is below the decomposition temperature of the polymer. Sulfur was added to the polyvinyl acetate polymer in amounts up to about 50% by weight of the polymer to produce modified polymers having significantly different and unexpected mechanical properties, as compared with the pure polymers. In addition to the increase in melting point of the modified polymer, the addition of sulfur to the polyvinyl acetate polymers also produced a polymer material that was softer and more ductile in comparison with pure polyvinyl acetate polymers and showed no strain hardening like the homopolymer. In certain embodiments, the addition and mixing of sulfur described herein can be used for other polymers having similar melting point ranges.

One advantage of the sulfur modified polymers is that the polymer can then be produced at a highly competitive cost because sulfur is very abundant and much cheaper than the polymer. This allows for the vast quantities of sulfur that are produced as a byproduct of oil and gas production to be utilized, thereby eliminating environmental concerns associated with the storage thereof.

In certain embodiments, the sulfur modification of the polyvinyl acetate polymer can result in an increase in the melting points of the polymers by more than 40° C. In certain embodiments, the addition of sulfur to the polymer results in an increase of the melting point of the polymer by about 10° C., alternatively by about 20° C., alternatively by about 30° C. In certain embodiments, the addition of sulfur to the polymer results in an increase of the melting point of the polymer by about 50° C., or greater.

Further, the sulfur modified polyvinyl acetate polymer differs from that of the unmodified polyvinyl acetate polymer because the sulfur composition becomes part of the polymer structure and at high content. The sulfur modified polymers can be used in adhesives and as an oil resistant polymer. In alternate embodiments, the sulfur modified polymer finds use for use in crack repair of concrete structures.

EXAMPLES

Polyvinyl acetate polymers obtained from Scientific Polymer Products, Ontario, N.Y., USA were used as received. The technical specifications of the polymers are provided in Table 1. Elemental sulfur (99.9% purity) from Saudi Aramco was used.

TABLE 1

Characterization of Polymers.

| Resin | Product # | Class of Polymer | Manufacturer | $T_m$, ° C. | VA, % | Mw | Density g/cm$^3$ |
|---|---|---|---|---|---|---|---|
| PVAc1 | 1019 | Polyvinyl acetate | Scientific Polymer | 70* | 100 | 15000 | 1.1700 |
| PVAc2 | 347 | Polyvinyl acetate | Scientific Polymer | 105* | 100 | 100000 | 1.1700 |

*softening temperature as reported by the product data sheet

The sulfur modified polymers (SMP) were prepared in a Haake PolyDrive melt blender. In an effort to include as much sulfur as possible into the polymer blend, the composition of sulfur used was 50% and 70% by weight were employed. The Haake PolyDrive melt blender is designed for use as a computer-controlled torque rheometer. The pure polymer and sulfur-polymer blends were mixed in the melt blender at 100 rpm for various different blend times. The blender thus acts as a batch stirred reactor with a constant volume. Samples were collected following the mixing process and analyzed by different techniques. Blends of PVAc1/sulfur, containing 50% by weight sulfur were prepared in the melt blender. The blending time, $T_m$, was 10 minutes and reaction temperature was 200° C. This sample preparation procedure was repeated for blend times, $T_m$=15 min and 20 min. The above procedure was also repeated using PVAc2 and PVAc1. The samples were prepared at different processing times to investigate the effect of processing time on total sulfur content and the amount of bonded sulfur in the SMP. Estimating the amount of total sulfur in the SMP was possible, however estimating the amount of bonded sulfur in the SMP was unsuccessful. Three blend samples (PVAc1/S (50:50); PVAc1/S (30:70) and PVAc2/S (50:50)) were prepared at processing time of 15 min.

A Vario EL elemental analyzer was used to determine the amount of free sulfur present in SMP. The thermal behavior of the pure resins and blends was determined by means of a TA Q1000 DSC. Samples of 7-10 mg were weighed and sealed in aluminum hermetic pans. Melting temperature measurements were performed by heating samples from room temperature to 250° C. at a heating rate of 10° C./min, with a nitrogen purge gas at a flow rate of about 50 mL/min.

TABLE 2

Mechanical Properties of pure and sulfur modified PVAc

| Property | Pure PVAc | PVAc + 50% Sulfur |
|---|---|---|
| Young's Modulus (MPa) | 4.31 | 1.93 |
| Yield Strength (MPa) | 21.51 | 9.05 |
| % Elongation | 68.32 | 30.84 |

As shown in Table 2, the addition of sulfur to the polyvinyl acetate resulted in a softer material which demonstated a drop in mechanical properties as the material started to elongate freely after the yield point (no strain hardening behavior). Table 3 provides the results of analysis technique used to estimate total sulfur present in the SMP. The results closely match the actual amount of sulfur used in the blending process. The SMP is not soluble in hot alcohol or hot acetone.

TABLE 3

% of Sulfur (S) in SMP.

| No. | Sample ID | Mw | S, wt. % | Time (min) | Temp (° C.) | Total Measured Sulfur (wt. %) |
|---|---|---|---|---|---|---|
| 1 | PVAc1 | 15000 | 50 | 10 | 200 | 55.9 |
| 2 | PVAc1 | 15000 | 50 | 15 | 200 | 53.4 |
| 3 | PVAc1 | 15000 | 50 | 20 | 200 | 51.1 |
| 4 | PVAc2 | 100000 | 50 | 10 | 200 | 47.3 |
| 5 | PVAc2 | 100000 | 50 | 15 | 200 | 49.8 |
| 6 | PVAc2 | 100000 | 50 | 20 | 200 | 50.4 |
| 7 | PVAc1 | 15000 | 70 | 10 | 200 | 71.0 |
| 8 | PVAc1 | 15000 | 70 | 15 | 200 | 69.5 |
| 9 | PVAc1 | 15000 | 70 | 20 | 200 | 71.6 |
| 10 | PVAc2 | 100000 | 70 | 10 | 200 | 73.0 |
| 11 | PVAc2 | 100000 | 70 | 15 | 200 | 70.9 |
| 12 | PVAc2 | 100000 | 70 | 20 | 200 | 65.8 |

Figure 2:
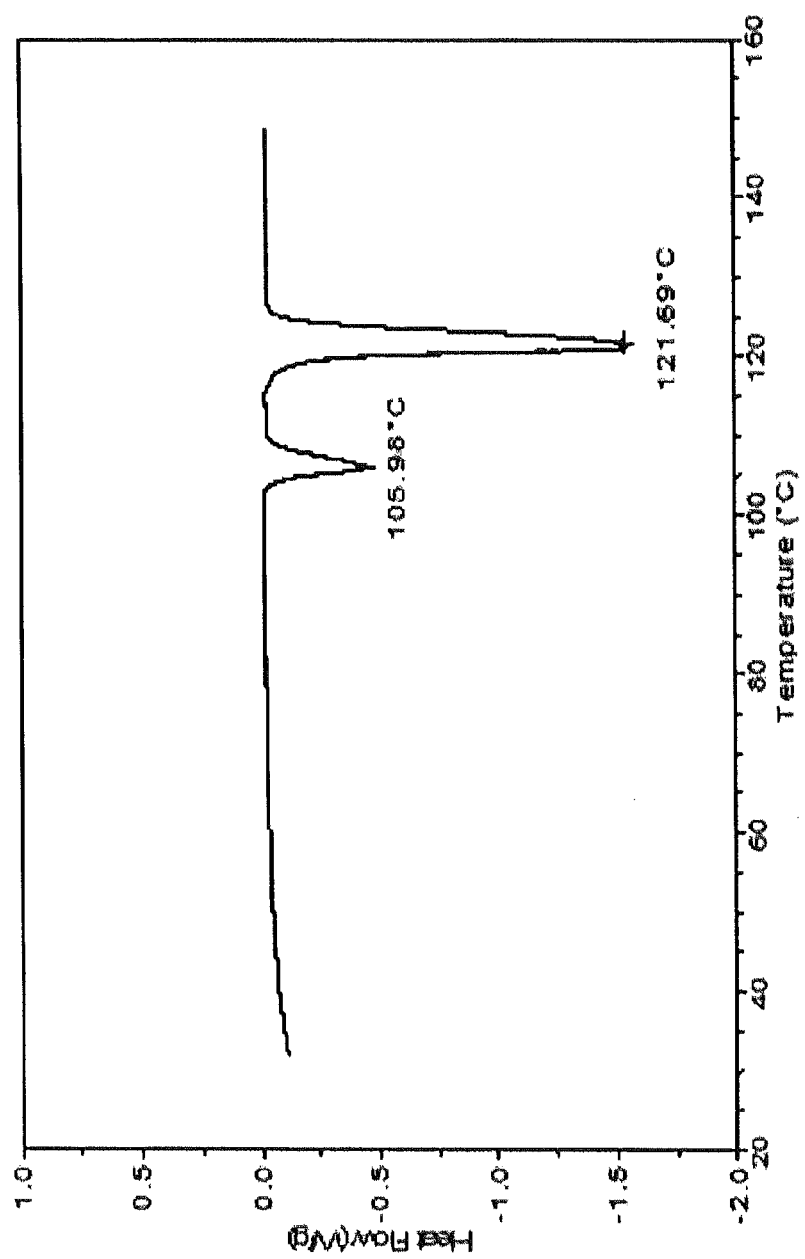
FIG. 2 is a thermal analysis curve of sulfur.
Figure 3:
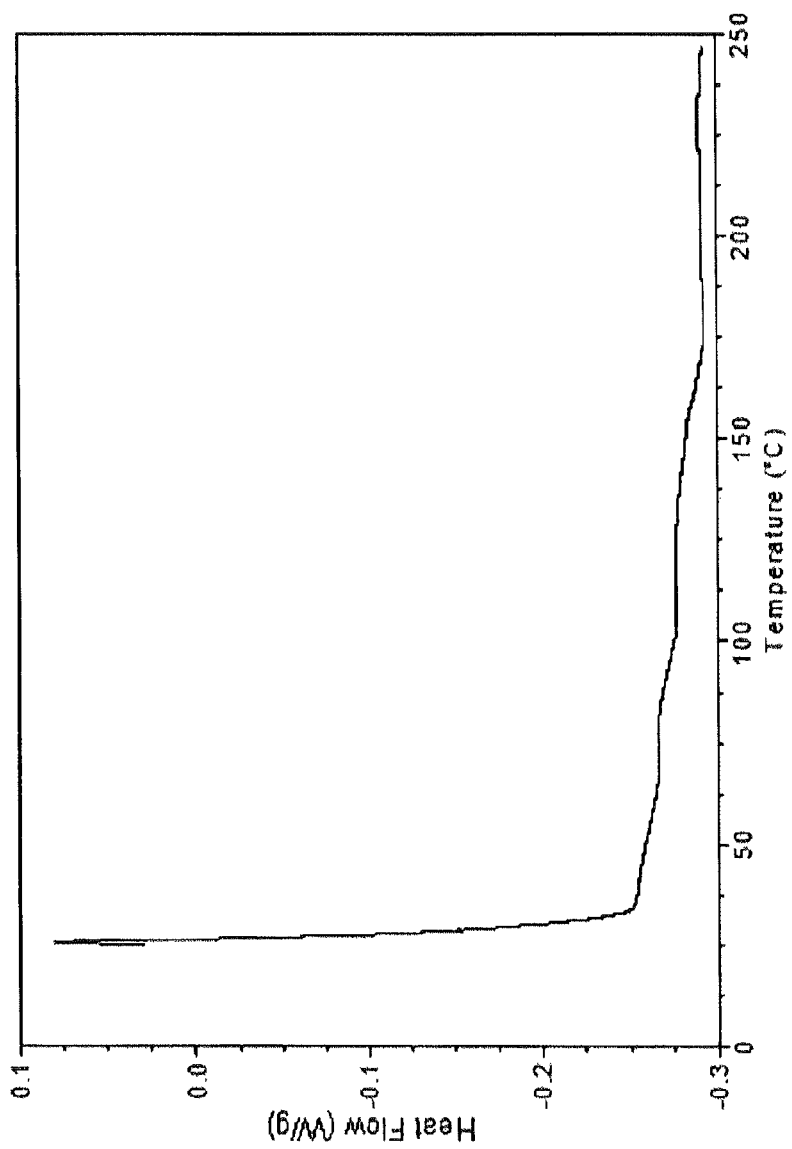
FIG. 3 is a thermal analysis curve of a polyvinyl acetate sample.
Figure 4:
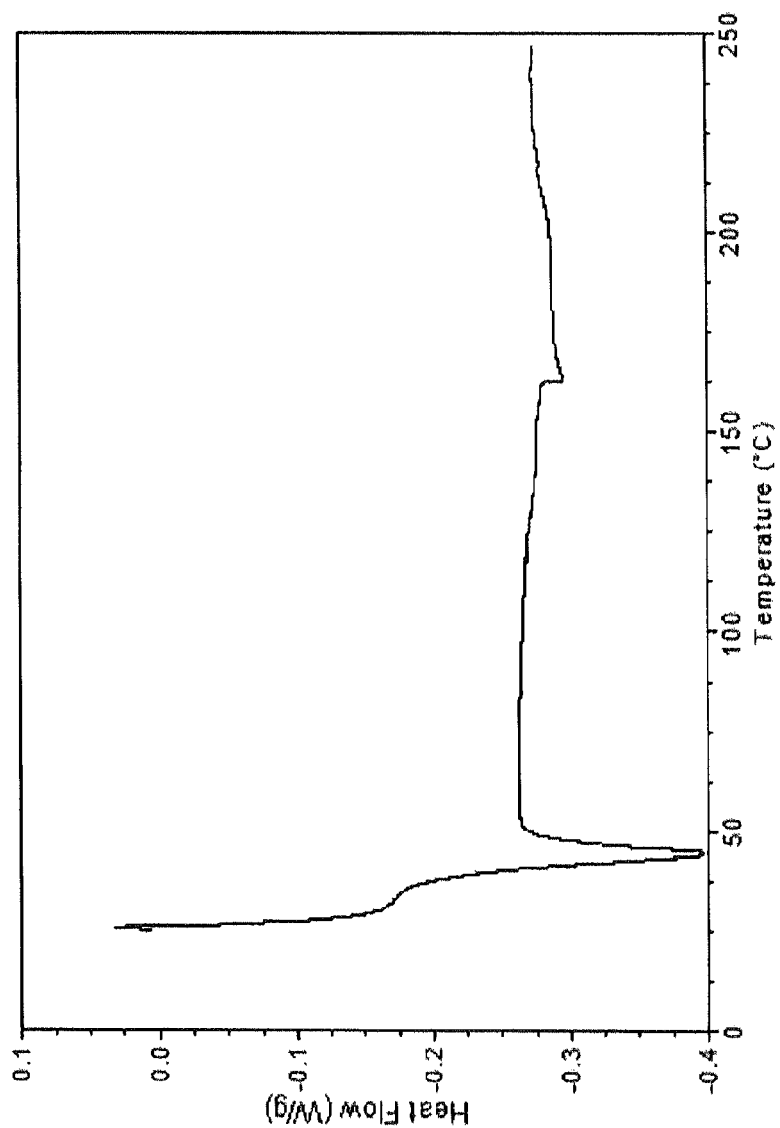
FIG. 4 is a thermal analysis curve of a second polyvinyl acetate sample.
Figure 5:
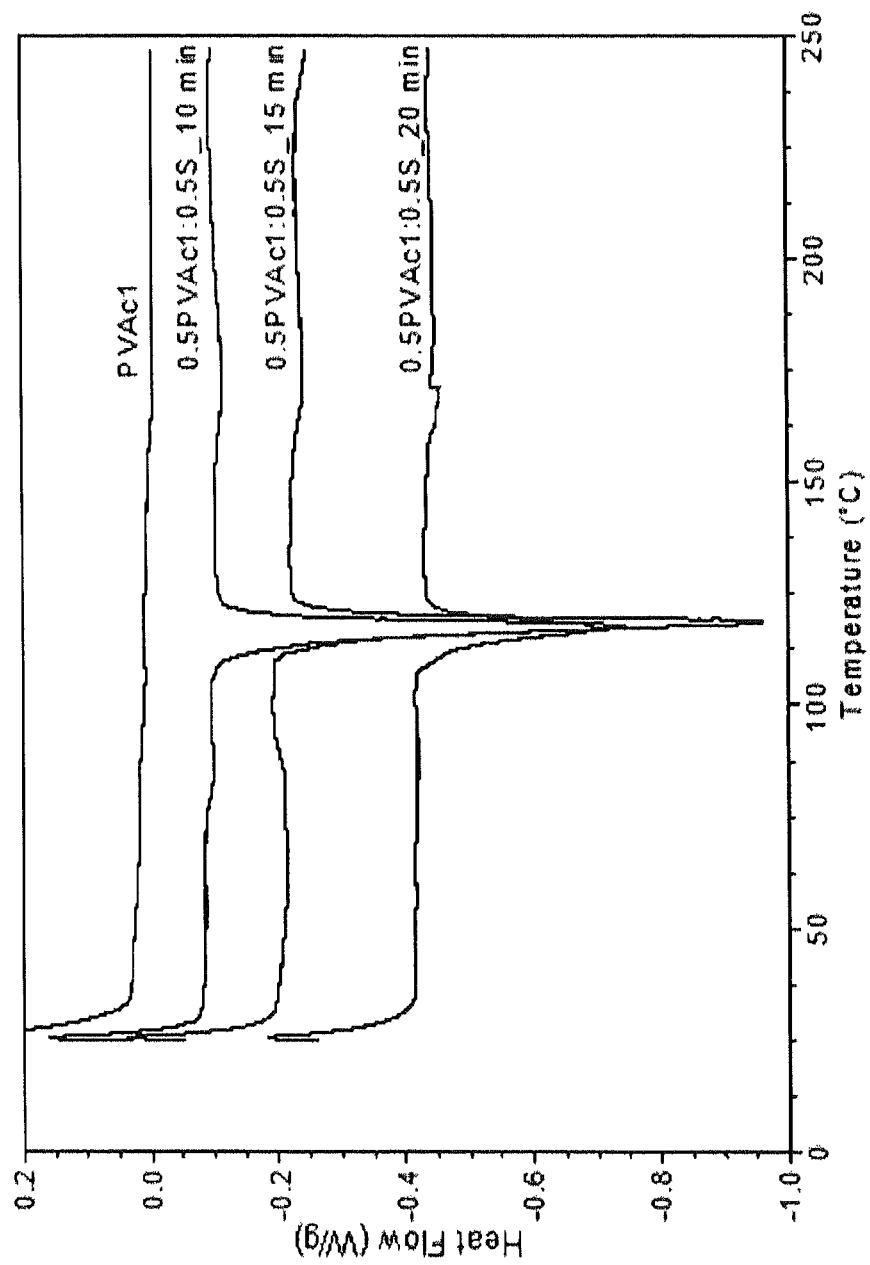
FIG. 5 is a thermal analysis curve of a sulfur modified polyvinyl acetate sample.
Figure 6:
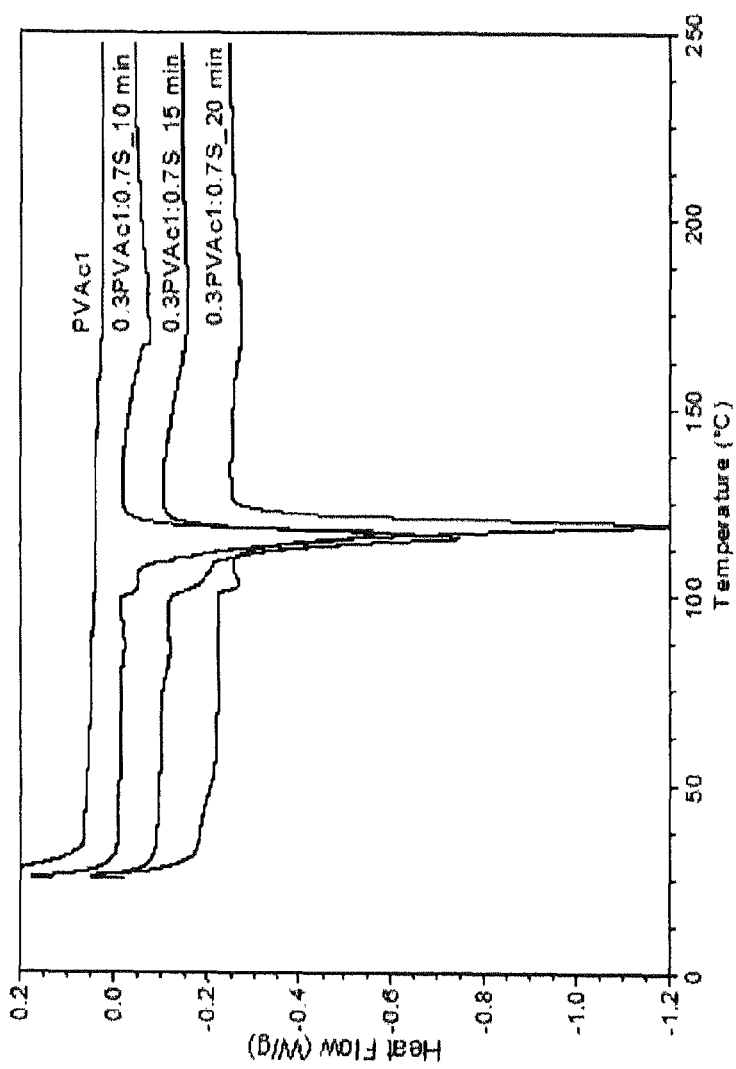
FIG. 6 is a thermal analysis curve of another sulfur modified polyvinyl acetate sample.
Figure 7:
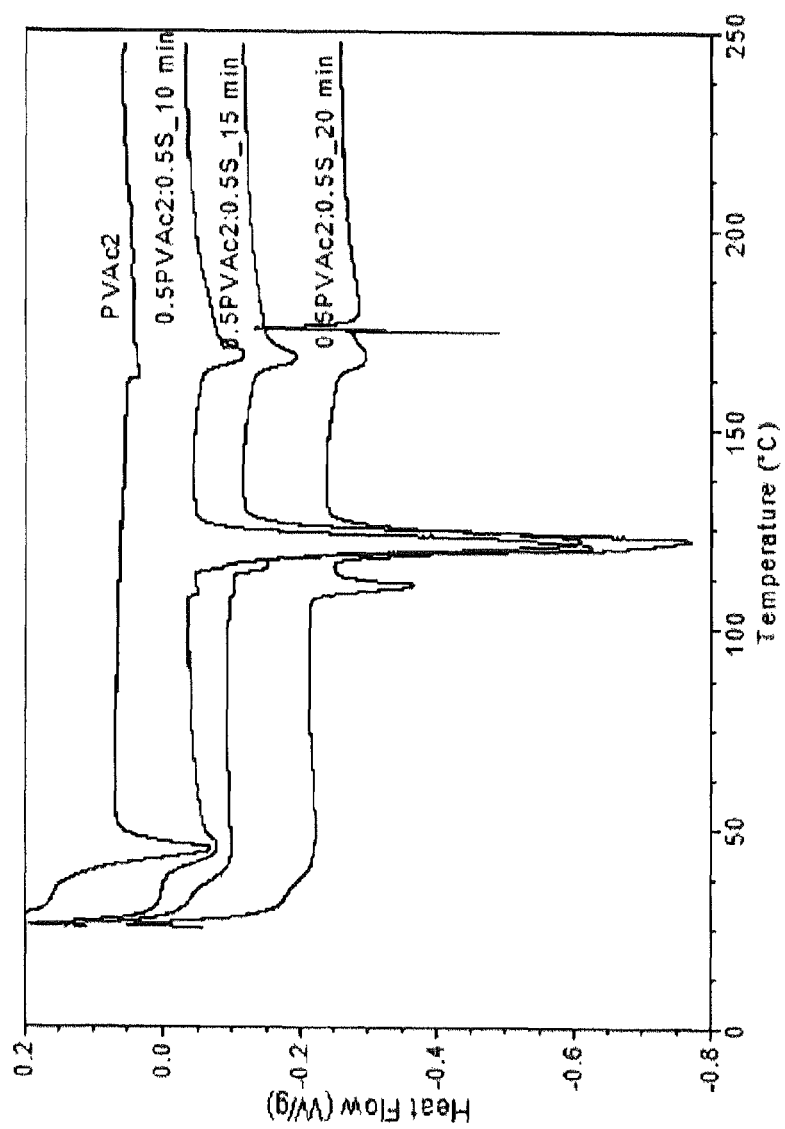
FIG. 7 is a thermal analysis curve of another sulfur modified polyvinyl acetate sample.
Figure 8:
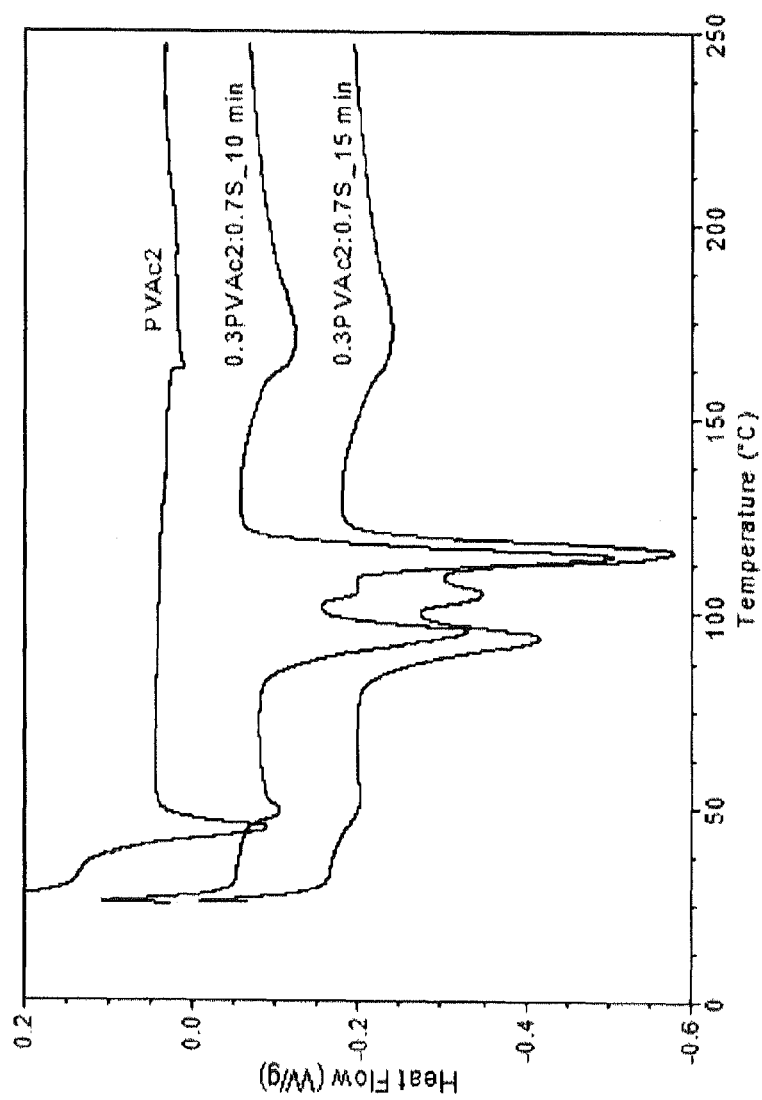
FIG. 8 is a thermal analysis curve of another sulfur modified polyvinyl acetate sample.

FIGS. 2-8 show the DSC melting thermograms of the pure sulfur, PVAc and several of the sulfur modified polyvinyl acetate blends. Pure sulfur exhibited two distinct peaks at approximately 106° C. and 122° C., as shown in FIG. 2, indicating the melting transition of two crystal constituents. Pure PVAc1 (Mw=15000) shown in FIG. 3 shows a gradual softening transition as the temperature increases up to 150° C. Pure PVAc2 (Mw=100000) shown in FIG. 4 display a strong peak at around 40° C. and a weak peak around 160° C. It is not believed that the weak peak corresponds to the thermal degradation of PVAc, which is believed to occur at above 227° C. FIG. 5 shows the DSC thermograms of several different blends of PVAc1/sulfur (having 50:50 compositions) prepared at different blending times. A single melting peak around 120° C. for each of the blends corresponds to the thermogram observed in the pure sulfur indicating the presence of sulfur in each of the blends. As shown in FIG. 6, increasing the sulfur content in the blend results in a similar trend wherein the thermograms of the various polymer blends show similar melting peaks associated with the presence of free sulfur. As shown in FIGS. 7 and 8, the observed peaks correspond to those of sulfur and the pure polyvinyl acetate polymer sample, which may correspond to a new material resulting from the reaction of sulfur and the polymer.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A sulfur modified polyvinyl acetate polymer composition, the polymer composition comprising:
   a polyvinyl acetate polymer having a melting point of less than 140° C.; and
   sulfur, wherein the sulfur is present in a range of 65.8% to 73% by weight, based on the weight of the polymer, such that the sulfur modified polymer has an increased melting point as compared to the melting point of the unmodified polyvinyl acetate polymer.

2. The polymer composition of claim 1, wherein the composition does not contain asphalt, bitumen, and combinations thereof.

3. The polymer composition of claim 1 wherein at least a portion of the sulfur is present in elemental form.

4. The polymer composition of claim 1 wherein the sulfur modified polyvinyl acetate polymer composition has a melting point that is up to 50° C. greater than the melting point of the unmodified polyvinyl acetate polymer.

5. The polymer composition of claim 1 wherein the sulfur modified polyvinyl acetate polymer composition has a melting point that is between 10° C. and 50° C. greater than the melting point of the unmodified polyvinyl acetate polymer.

6. The polymer composition of claim 1 wherein the sulfur modified polyvinyl acetate polymer composition has a melting point that is between 10° C. and 30° C. greater than the melting point of the unmodified polyvinyl acetate polymer.

7. The polymer composition of claim 1, wherein the sulfur modified polyvinyl acetate polymer composition has a melting point that is between 20° C. and 40° C. greater than the melting point of the unmodified polyvinyl acetate polymer.

8. The polymer composition of claim 1, wherein the sulfur modified polyvinyl acetate polymer composition has a melting point that is between 30° C. and 50° C. greater than the melting point of the unmodified polyvinyl acetate polymer.

9. The polymer composition of claim 1, wherein the polyvinyl acetate polymer has a molecular weight of between 10,000 and 25,000.

10. The polymer composition of claim 1, wherein the polyvinyl acetate polymer has a molecular weight of between 25,000 and 75,000.

11. The polymer composition of claim 1, wherein the polyvinyl acetate polymer has a molecular weight of between 75,000 and 125,000.

\* \* \* \* \*